United States Patent
Aibester et al.

(10) Patent No.: US 10,250,530 B2
(45) Date of Patent: Apr. 2, 2019

(54) FLEXIBLE BUFFER ALLOCATION IN A NETWORK SWITCH

(71) Applicant: Mellanox Technologies TLV Ltd., Raanana (IL)

(72) Inventors: Niv Aibester, Herzliya (IL); Amir Roitshtein, Holon (IL); Barak Gafni, Kfar Malal (IL); George Elias, Tel Aviv (IL); Itamar Rabenstein, Petah Tikva (IL)

(73) Assignee: Mellanox Technologies TLV Ltd., Raanana (IL)

( * ) Notice: Subject to any disclaimer, the term of this patent is extended or adjusted under 35 U.S.C. 154(b) by 196 days.

(21) Appl. No.: 15/063,527

(22) Filed: Mar. 8, 2016

(65) Prior Publication Data

US 2017/0264571 A1    Sep. 14, 2017

(51) Int. Cl.
   *H04L 12/861*    (2013.01)

(52) U.S. Cl.
   CPC ................ *H04L 49/9005* (2013.01)

(58) Field of Classification Search
   CPC ................ H04L 49/90; H04L 49/9005
   See application file for complete search history.

(56) References Cited

U.S. PATENT DOCUMENTS

| | | | |
|---|---|---|---|
| 6,108,713 A | 8/2000 | Sambamurthy et al. | |
| 6,178,448 B1 | 1/2001 | Gray et al. | |
| 6,594,263 B1 | 7/2003 | Martinsson et al. | |
| 7,321,553 B2 | 1/2008 | Prasad et al. | |
| 7,346,059 B1 | 3/2008 | Gamer et al. | |
| 7,738,454 B1 | 6/2010 | Panwar et al. | |
| 7,821,939 B2 | 10/2010 | Decusatis et al. | |
| 8,078,743 B2 | 12/2011 | Sharp et al. | |

(Continued)

FOREIGN PATENT DOCUMENTS

| | | |
|---|---|---|
| EP | 1720295 A1 | 11/2006 |
| EP | 2466476 A1 | 6/2012 |

(Continued)

OTHER PUBLICATIONS

U.S. Appl. No. 14/994,164 office action dated Jul. 5, 2017.
(Continued)

*Primary Examiner* — Rhonda L Murphy
(74) *Attorney, Agent, or Firm* — Kligler & Associates

(57) ABSTRACT

Communication apparatus includes multiple interfaces configured to be connected to a packet data network for receiving and forwarding of data packets of multiple types. A memory is coupled to the interfaces and configured as a buffer to contain packets received through the ingress interfaces while awaiting transmission to the network via the egress interfaces. Packet processing logic is configured to maintain multiple transmit queues, which are associated with respective ones of the egress interfaces, and to place both first and second queue entries, corresponding to first and second data packets of the first and second types, respectively, in a common transmit queue for transmission through a given egress interface, while allocating respective spaces in the buffer to store the first and second data packets against separate, first and second buffer allocations, which are respectively assigned to the first and second types of the data packets.

12 Claims, 3 Drawing Sheets

(56) References Cited

U.S. PATENT DOCUMENTS

| | | | |
|---|---|---|---|
| 8,345,548 | B2 | 1/2013 | Gusat et al. |
| 8,473,693 | B1 | 6/2013 | Muppalaneni et al. |
| 8,576,715 | B2 | 11/2013 | Bloch et al. |
| 8,630,294 | B1 | 1/2014 | Keen et al. |
| 8,767,561 | B2 | 7/2014 | Gnanasekaran et al. |
| 8,811,183 | B1 | 8/2014 | Anand et al. |
| 8,879,396 | B2 | 11/2014 | Guay et al. |
| 8,989,017 | B2 | 3/2015 | Naouri |
| 8,995,265 | B2 | 3/2015 | Basso et al. |
| 9,014,006 | B2 | 4/2015 | Haramaty et al. |
| 9,325,619 | B2 | 4/2016 | Guay et al. |
| 9,356,868 | B2 | 5/2016 | Tabatabaee et al. |
| 9,426,085 | B1 | 8/2016 | Anand et al. |
| 2002/0055993 | A1 | 5/2002 | Shah et al. |
| 2002/0191559 | A1 | 12/2002 | Chen et al. |
| 2003/0108010 | A1 | 6/2003 | Kim et al. |
| 2003/0223368 | A1 | 12/2003 | Allen et al. |
| 2004/0008714 | A1* | 1/2004 | Jones ............... H04L 47/2441 370/428 |
| 2005/0053077 | A1 | 3/2005 | Blanc et al. |
| 2005/0169172 | A1* | 8/2005 | Wang ............... H04L 41/5003 370/229 |
| 2005/0216822 | A1 | 9/2005 | Kyusojin et al. |
| 2005/0226156 | A1 | 10/2005 | Keating et al. |
| 2005/0228900 | A1 | 10/2005 | Stuart et al. |
| 2006/0087989 | A1 | 4/2006 | Gai et al. |
| 2006/0088036 | A1 | 4/2006 | De Prezzo |
| 2006/0092837 | A1 | 5/2006 | Kwan et al. |
| 2006/0092845 | A1 | 5/2006 | Kwan et al. |
| 2007/0097257 | A1 | 5/2007 | El-Maleh et al. |
| 2007/0104102 | A1 | 5/2007 | Opsasnick |
| 2007/0104211 | A1 | 5/2007 | Opsasnick |
| 2007/0201499 | A1 | 8/2007 | Kapoor et al. |
| 2007/0291644 | A1 | 12/2007 | Roberts et al. |
| 2008/0037420 | A1 | 2/2008 | Tang et al. |
| 2008/0175146 | A1 | 7/2008 | Van Leekwuck et al. |
| 2008/0192764 | A1 | 8/2008 | Arefi et al. |
| 2009/0207848 | A1 | 8/2009 | Kwan et al. |
| 2010/0220742 | A1 | 9/2010 | Brewer et al. |
| 2013/0014118 | A1 | 1/2013 | Jones |
| 2013/0039178 | A1 | 2/2013 | Chen et al. |
| 2013/0250757 | A1 | 9/2013 | Tabatabaee et al. |
| 2013/0250762 | A1 | 9/2013 | Assarpour |
| 2013/0275631 | A1 | 10/2013 | Magro et al. |
| 2013/0286834 | A1 | 10/2013 | Lee |
| 2013/0305250 | A1 | 11/2013 | Durant |
| 2014/0133314 | A1 | 5/2014 | Mathews et al. |
| 2014/0269274 | A1 | 9/2014 | Banavalikar et al. |
| 2014/0269324 | A1 | 9/2014 | Tietz et al. |
| 2015/0026361 | A1 | 1/2015 | Matthews et al. |
| 2015/0124611 | A1 | 5/2015 | Attar et al. |
| 2015/0127797 | A1* | 5/2015 | Attar ............... H04L 47/125 709/223 |
| 2015/0180782 | A1* | 6/2015 | Rimmer ............... H04L 69/22 370/236 |
| 2015/0200866 | A1* | 7/2015 | Pope ............... G06F 13/128 370/413 |
| 2015/0381505 | A1 | 12/2015 | Sundararaman et al. |
| 2016/0135076 | A1 | 5/2016 | Grinshpun et al. |
| 2017/0118108 | A1 | 4/2017 | Avci et al. |
| 2017/0142020 | A1 | 5/2017 | Sundararaman et al. |
| 2017/0180261 | A1 | 6/2017 | Ma et al. |
| 2017/0187641 | A1 | 6/2017 | Lundqvist et al. |
| 2017/0295112 | A1 | 10/2017 | Cheng et al. |
| 2018/0205653 | A1 | 7/2018 | Wang et al. |

FOREIGN PATENT DOCUMENTS

| | | |
|---|---|---|
| WO | 2009107089 A2 | 9/2009 |
| WO | 2013136355 A1 | 9/2013 |
| WO | 2013180691 A1 | 12/2013 |

OTHER PUBLICATIONS

U.S. Appl. No. 15/075,158 office action dated Aug. 24, 2017.

European Application # 17172494.1 search report dated Oct. 13, 2017.

European Application # 17178355 search report dated Nov. 13, 2017.

CISCO Systems, Inc., "Priority Flow Control: Build Reliable Layer 2 Infrastructure", 8 pages, 2015.

Gran et al., "Congestion Management in Lossless Interconnection Networks", Submitted to the Faculty of Mathematics and Natural Sciences at the University of Oslo in partial fulfillment of the requirements for the degree Philosophiae Doctor, 156 pages, Sep. 2013.

Pfister et al., "Hot Spot Contention and Combining in Multistage Interconnect Networks", IEEE Transactions on Computers, vol. C-34, pp. 943-948, Oct. 1985.

Zhu et al., "Congestion control for large-scale RDMA depolyments", SIGCOMM'15, pp. 523-536, Aug. 17-21, 2015.

Hahne et al., "Dynamic Queue Length Thresholds for Multiple Loss Priorities", IEEE/ACM Transactions on Networking, vol. 10, No. 3, pp. 368-380, Jun. 2002.

Choudhury et al., "Dynamic Queue Length Thresholds for Shared-Memory Packet Switches", IEEE/ACM Transactions Networking, vol. 6, Issue 2 , pp. 130-140, Apr. 1998.

Gafni et al., U.S. Appl. No. 14/672,357, filed Mar. 30, 3015.

Ramakrishnan et al., "The Addition of Explicit Congestion Notification (ECN) to IP", Request for Comments 3168, Network Working Group, 63 pages, Sep. 2001.

IEEE Standard 802.1Q™-2005, "IEEE Standard for Local and metropolitan area networks Virtual Bridged Local Area Networks", 303 pages, May 19, 2006.

INFINIBAND TM Architecture, Specification vol. 1, Release 1.2.1, Chapter 12, pp. 657-716, Nov. 2007.

IEEE Std 802.3, Standard for Information Technology—Telecommunications and information exchange between systems—Local and metropolitan area networks—Specific requirements; Part 3: Carrier Sense Multiple Access with Collision Detection (CSMA/CD) Access Method and Physical Layer Specifications Corrigendum 1: Timing Considerations for PAUSE Operation, Annex 31B (MAC Control PAUSE operation), pp. 763-772, year 2005.

IEEE Std 802.1Qbb., IEEE Standard for Local and metropolitan area networks—"Media Access Control (MAC) Bridges and Virtual Bridged Local Area Networks—Amendment 17: Priority-based Flow Control", 40 pages, Sep. 30, 2011.

Elias et al., U.S. Appl. No. 14/718,114, filed May 21, 2015.

Gafni et al., U.S. Appl. No. 15/075,158, filed Mar. 20, 2016.

Shpiner et al., U.S. Appl. No. 14/967,403, filed Dec. 14, 2015.

Elias et al., U.S. Appl. No. 14/994,164, filed Jan. 13, 2016.

Elias et al., U.S. Appl. No. 15/081,969, filed Mar. 28, 2016.

Kriss et al., U.S. Appl. No. 15/161,316, filed May 23, 2016.

Roitshtein et al., U.S. Appl. No. 14/961,923, filed Dec. 8, 2015.

CISCO Systems, Inc.,"Advantage Series White Paper Smart Buffering", 10 pages, 2016.

Hoeiland-Joergensen et al., "The FlowQueue-CoDel Packet Scheduler and Active Queue Management Algorithm", Internet Engineering Task Force (IETF) as draft-ietf-aqm-fq-codel-06 , 23 pages, Mar. 18, 2016.

U.S. Appl. No. 14/718,114 Office Action dated Sep. 16, 2016.

U.S. Appl. No. 14/672,357 Office Action dated Sep. 28, 2016.

U.S. Appl. No. 14/967,403 office action dated Nov. 9, 2017.

U.S. Appl. No. 15/081,969 office action dated Oct. 5, 2017.

U.S. Appl. No. 15/161,316 office action dated Feb. 7, 2018.

U.S. Appl. No. 15/081,969 office action dated May 17, 2018.

U.S. Appl. No. 15/432,962 office action dated Apr. 26, 2018.

U.S. Appl. No. 15/161,316 Office Action dated Jul. 20, 2018.

U.S. Appl. No. 15/432,962 office action dated Nov. 2, 2018.

U.S. Appl. No. 15/469,652 office action dated Nov. 2, 2018.

U.S. Appl. No. 15/161,316 Office Action dated Dec. 11, 2018.

* cited by examiner

FLEXIBLE BUFFER ALLOCATION IN A NETWORK SWITCH

FIELD OF THE INVENTION

The present invention relates generally to packet communication networks, and particularly to buffer management in switches that are deployed in such networks.

BACKGROUND

Switches used in high-speed packet networks, such as Ethernet and InfiniBand networks, typically contain buffer memories. Packets received by the switch through one of its interfaces are stored temporarily in a buffer memory while awaiting transfer to the appropriate egress interface or possibly, in the case of multicast packets, to multiple egress interfaces. Although buffer memory may be allocated statically to each interface, many modern packet switches use a shared memory, in which buffer space is allocated flexibly to different interfaces and queues depending on traffic load and memory availability, as well as packet ingress priority and packet priorities that are set after processing in the switch.

As one example, U.S. Patent Application Publication 2013/0250762 describes a method for achieving lossless behavior for multiple ports sharing a buffer pool. Packets are "colored" and stored in a shared packet buffer without assigning fixed page allocations per port.

SUMMARY

Embodiments of the present invention that are described hereinbelow provide improved methods and apparatus for buffer management in a network element.

There is therefore provided, in accordance with an embodiment of the invention, communication apparatus, which includes multiple interfaces configured to be connected to a packet data network so as to serve as both ingress and egress interfaces in receiving and forwarding of data packets of multiple types, including at least first and second types, from and to the network by the apparatus. A memory is coupled to the interfaces and configured as a buffer to contain packets received through the ingress interfaces while awaiting transmission to the network via the egress interfaces. Packet processing logic is configured to maintain multiple transmit queues, which are associated with respective ones of the egress interfaces, and to place both first and second queue entries, corresponding to first and second data packets of the first and second types, respectively, in a common transmit queue for transmission through a given egress interface, while allocating respective spaces in the buffer to store the first and second data packets against separate, first and second buffer allocations, which are respectively assigned to the first and second types of the data packets.

In one embodiment, the first type of the data packets consists of unicast packets, while the second type of the data packets consists of multicast packets. Additionally or alternatively, the first and second types of the data packets are transmitted using different, respective, first and second transport protocols.

Typically, the packet processing logic is configured, when a given queue entry reaches a head of the common transmit queue, to transmit a corresponding data packet through the given egress interface and to release a corresponding space in a respective one of the first and second buffer allocations.

In some embodiments, the first buffer allocation is shared over multiple transmit queues associated with multiple, different egress interfaces through which the data packets of the first type are transmitted.

Additionally or alternatively, the multiple transmit queues include at least two transmit queues that are both associated with the same, given egress interface and have different, respective levels of quality of service, and the first and second data packets of the different, first and second types have a common level of quality of service.

In a disclosed embodiment, the packet processing logic is configured to apply a congestion avoidance mechanism separately to the first and second types of the data packets responsively to respective fill levels of the first and second buffer allocations.

There is also provided, in accordance with an embodiment of the invention, a method for communication, which includes receiving through ingress interfaces of a network element data packets of multiple types, including at least first and second types. Respective spaces in a buffer in the network element are allocated to store the first and second data packets against separate, first and second buffer allocations, which are respectively assigned to the first and second types of the data packets, while the data packets await transmission to the network via egress interfaces of the network element. In the network element, multiple transmit queues are maintained, which are associated with respective ones of the egress interfaces. Both first and second queue entries, corresponding to first and second data packets of the first and second types, respectively, are placed in a common transmit queue for transmission through a given egress interface. Each of the first and second data packets is transmitted through the given egress interface when the corresponding queue entries reach a head of the common transmit queue.

The present invention will be more fully understood from the following detailed description of the embodiments thereof, taken together with the drawings in which:

DETAILED DESCRIPTION OF EMBODIMENTS

In network elements, such as switches, that are known in the art, queuing and buffering are generally tightly coupled together. In other words, when a packet enters a given transmit queue, to be transmitted through a certain egress interface of the switch, the packet occupies a slot in the buffer space that is associated with the queue until it is transmitted. Thus, for example, when packets of different types (such as broadcast, multicast and unicast packets, or packets transmitted using different protocols, for example TCP and UDP packets) share the same transmit queue, they also necessarily share the same buffer allocation. Consequently, when heavy traffic of one type causes congestion on a given transmit queue, the resulting congestion avoidance measures (such as dropping or marking packets or applying back pressure on ingress ports) will also be applied to the other types of packets that share the transmit queue.

Embodiments of the present invention that are described herein loosen—and may decouple completely—the connection between queue assignment and buffer occupancy, and thus afford greater flexibility in allocation and management of communication resources. In the disclosed embodiments, different packet types can be assigned separate, respective allocations of buffer space in a network element even when these different packet types share a common transmit queue. Packet processing logic in the network element places queue entries corresponding to the data packets in the common transmit queue for transmission through the appropriate egress interface, while allocating respective spaces in the shared buffer to store the different types of data packets against their separate, respective buffer allocations. A given packet type in a given queue may receive its own buffer allocation, or a common buffer space may be allocated for packets of the given type across multiple transmit queues, meaning that packets of this type in the different queues share the same, common buffer allocation. When a given queue entry reaches the head of the common transmit queue, the corresponding data packet is transmitted through the egress interface and the space in the respective buffer allocation is released.

Thus, by appropriate allocation of the respective buffer spaces, it is possible to assign different, independent shares of the network resources to different packet types. The buffer allocation for any given packet type may be assigned per transmit queue, or per egress interface, or may be shared over multiple transmit queues associated with multiple, different egress interfaces through which the data packets of the given type are to be transmitted. As a consequence of this decoupling of the buffer allocation and queuing mechanisms, the packet processing logic can apply congestion avoidance mechanisms separately to the different types of the data packets, in response to the fill levels of the respective buffer allocations.

Figure 1:
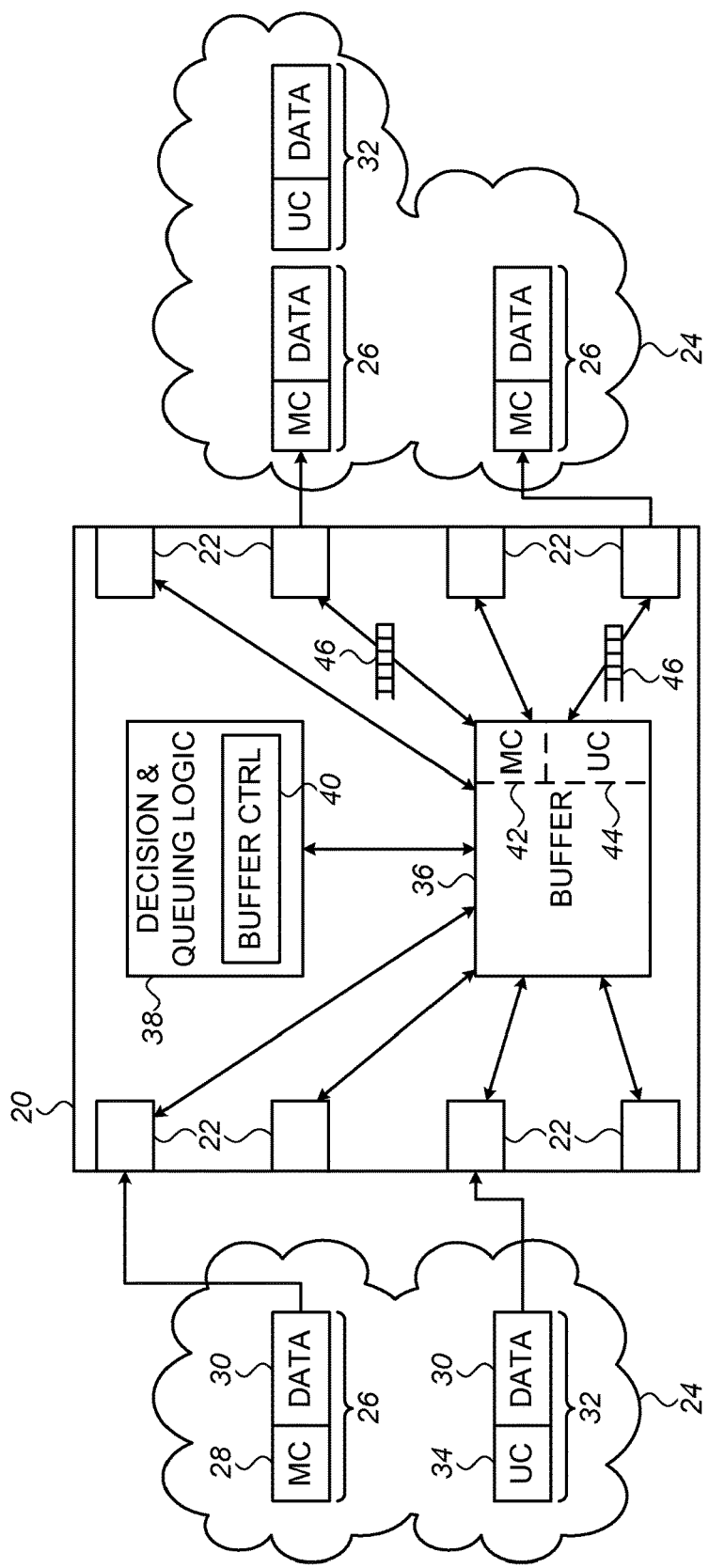
FIG. 1 is a block diagram that schematically illustrates a switch with a shared buffer, in accordance with an embodiment of the invention.
Figure 2:
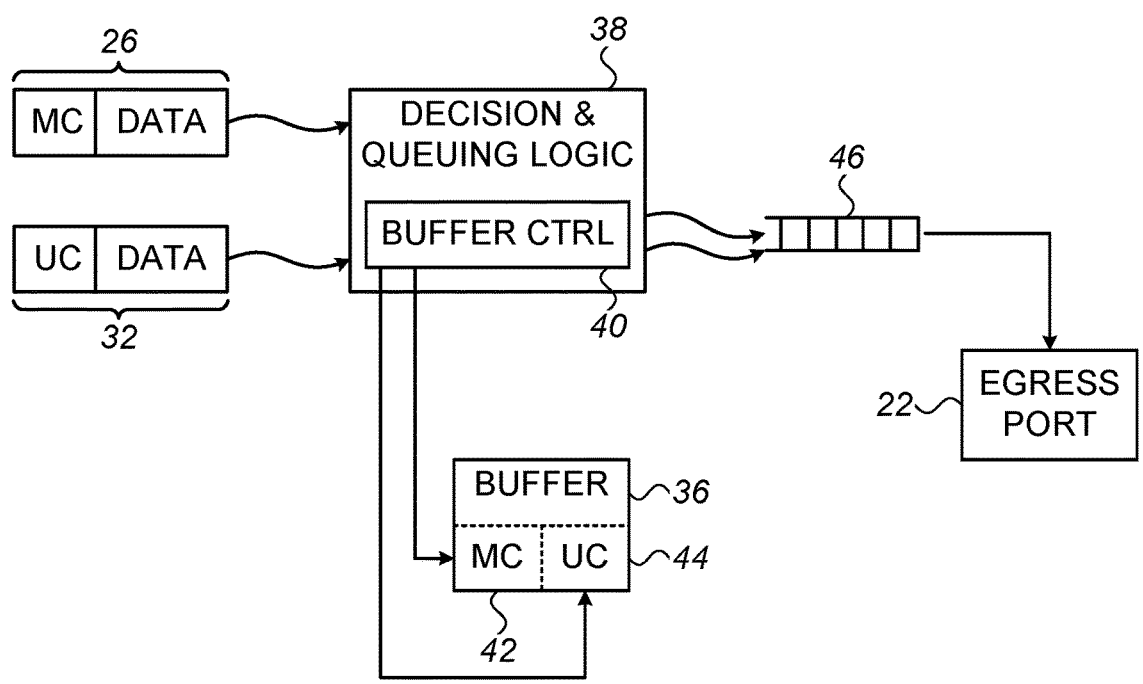
FIG. 2 is a block diagram that schematically illustrates a flow of data packets through a switch, in accordance with an embodiment of the invention.

Reference is now made to FIGS. 1 and 2, which schematically illustrate the operation a network switch 20 with a shared buffer, in accordance with an embodiment of the invention. FIG. 1 is a block diagram showing physical and functional components of switch 20, while FIG. 2 illustrates a flow of data packets of different types through the switch. In the pictured example, these different types include a multicast packet 26 and a unicast packet 32. Alternatively or additionally, the packet types may be differentiated by being transmitted using different, respective, transport protocols, such as the Transmission Control Protocol (TCP) and the User Datagram Protocol (UDP), or InfiniBand reliable-connected (RC), unreliable-connected (UC), and other transport types. Further alternatively or additionally, the packet processing logic in switch 20 may apply any other suitable criteria in differentiating between packet types, based on various header fields and/or deep packet inspection (DPI), for example.

Furthermore, although the present embodiment refers, for the sake of concreteness and clarity, to a network switch, the principles of the present invention may likewise be applied, mutatis mutandis, in other sorts of network elements that buffer and forward data packets, including (but not limited to) routers, bridges and tunneling elements, as well as in advanced network interface controllers that connect a host computer to a network.

As shown in FIG. 1, switch 20 comprises multiple interfaces, in the form of ports 22, which are connected to a packet data network 24 and typically serve as both ingress and egress interfaces. (Although only eight ports 22 are shown in FIG. 1 for the sake of simplicity, in practice switch 20 may typically have a substantially larger number of ports, or possibly fewer ports.) A memory 36, coupled to ports 22, is configured as a shared buffer to contain packets of different types that are assigned to multiple transmit queues 46 for transmission to the network.

In the pictured embodiment, switch 20 receives multicast packet 26 through an ingress port 22. Packet 26 comprises a header 28 bearing a multicast address and a data payload 30. Header 28 may comprise, for example, a Layer 2 header with a multicast MAC destination address or a Layer 3 header with a multicast IP destination address. Switch 20 receives unicast packet 32, with a unicast header 34 containing a unicast MAC destination address, through another ingress port 22. Ports 22 direct packets 26 and 32 to memory 36, where copies of the packets are stored while awaiting retransmission through the appropriate egress ports 22. Packet processing logic (referred to in this embodiment as decision and queuing logic 38) reads headers 28 and 34 and looks up the destination addresses in order to identify the egress ports 22 through which respective the packets are to be transmitted.

Meanwhile, buffer control logic 40 allocates space in the shared buffer in memory 36 for storage of copies of the packets awaiting transmission. (Buffer control logic 40 is considered to be a part of the packet processing logic for purposes of the present description and the claims, although in practice it may be implemented separately from decision and queuing logic 38.) Buffer control logic 40 assigns separate, respective allocations 42 and 44 in memory 36 for multicast and unicast packet types, and stores packets 26 and 32 against these allocations while awaiting transmission. Although multiple copies of multicast packet 26 may be transmitted through different egress ports 22, as illustrated in FIG. 1, buffer control logic 40 can be configured to store only a single copy of the packet, which is then replicated for transmission, as described, for example, in U.S. patent application Ser. No. 14/961,923, filed Dec. 8, 2015, whose disclosure is incorporated herein by reference.

For each packet accepted into a corresponding allocation 42, 44, . . . , in memory 36, decision and queuing logic 38 places a queue entry, referred to hereinbelow as a descriptor, in the appropriate transmit queue 46 (or possibly in multiple transmit queues, in the case of multicast packets). Although for the sake of simplicity, FIG. 1 shows only a single transmit queue per egress port 22, in practice multiple transmit queues can be associated with each egress interface, corresponding to different, respective levels of quality of service. Data packets of different types, such as multicast and unicast packets, that are assigned the same level of quality of service will then have their queue entries placed in the same transmit queue 46. Additionally or alternatively, logic 38 may apply other considerations (in addition to or instead of quality of service levels) in assigning packets to cues. As noted earlier, buffer allocations 42, 44, . . . , may each be associated with a particular egress port or transmit queue, or they may be shared over multiple transmit queues, which may be associated with multiple, different egress ports through which the data packets of the given type are transmitted.

When a given queue entry reaches the head of transmit queue 46 in which the entry has been placed, decision and queuing logic 38 reads (and replicates as necessary) the corresponding data packet from memory 36, and transmits the packet through the appropriate egress interface. Buffer control logic 40 will then release the corresponding space in buffer allocation 42 or 44.

Figure 3:
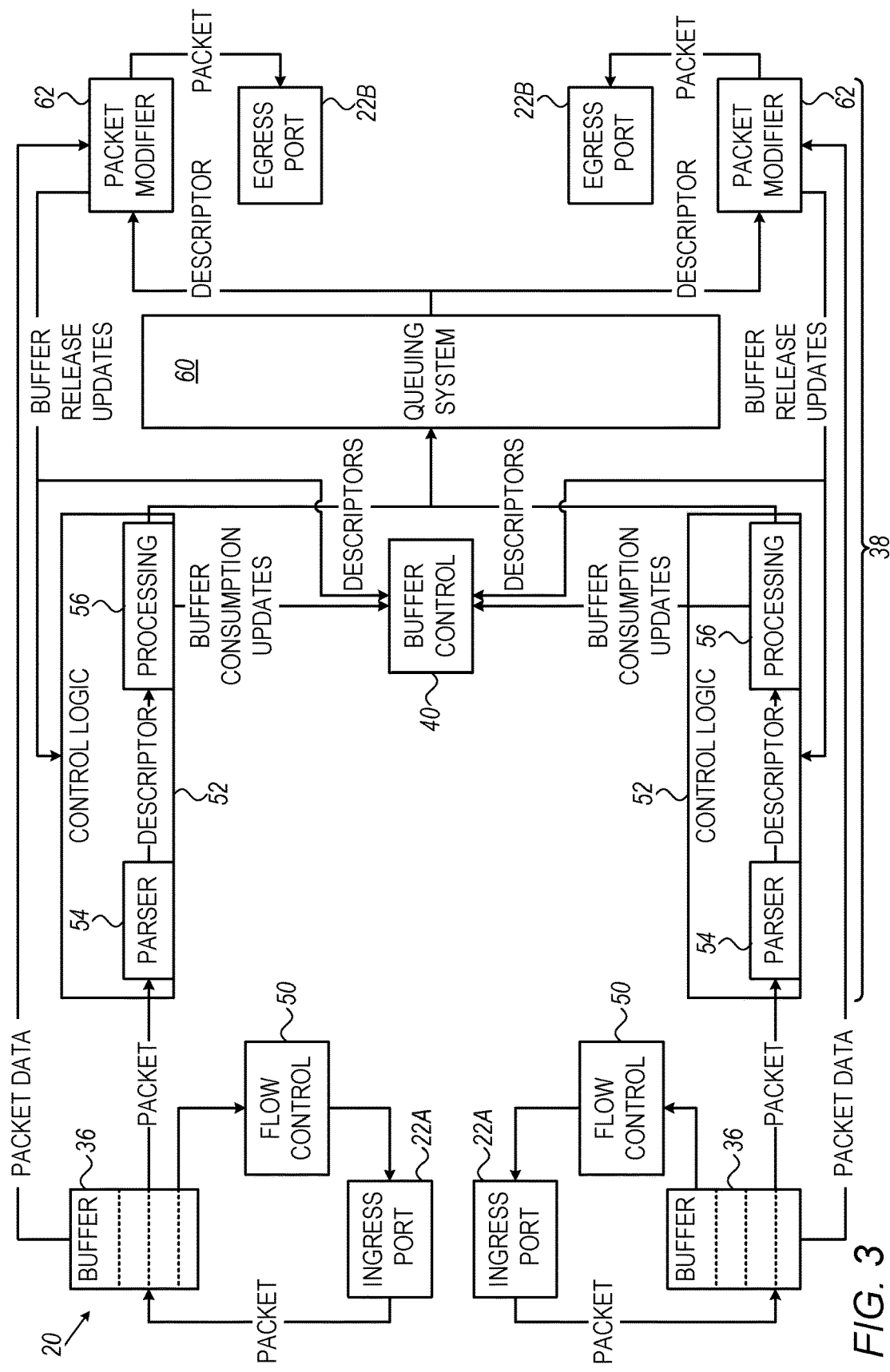
FIG. 3 is a block diagram that schematically shows details of packet processing logic in a switch, in accordance with an embodiment of the invention.

FIG. 3 is a block diagram that schematically shows details of decision and queuing logic 38 in switch 20, in accordance with an embodiment of the invention. For the sake of clarity and concreteness, this figure shows one possible implementation of logic 38, but other implementations will be apparent to those skilled in the art after reading the present description and are considered to be within the scope of the present invention. Although the elements of logic 38 are shown in FIG. 3 as separate functional components, in practice these components can be implemented together in custom or programmable hardware logic within a single chip or chip set.

Upon receiving an incoming packet, regardless of packet type, an ingress port 22A (such as one of ports 22 in FIG. 1) places the packet in a buffer in memory 36 and notifies decision control logic 52 that the packet is ready for processing. As explained earlier, the space in the buffer to store a packet of a given type is allocated against a separate buffer allocation 42, 44, . . . , that is assigned to this packet type in memory 36. Based on the respective fill levels of these buffer allocations, packet processing logic 38 can apply congestion avoidance mechanisms, such as a flow control mechanism 50 and/or packet dropping and marking mechanisms, separately to the different packet types.

In response to the notification received by decision control logic 52 that a new packet has arrived, a parser 54 parses the packet header and generates one or more descriptors, which it passes to a descriptor processor 56 for further handling and generation of forwarding instructions. Based on the descriptors, for example, processor 56 typically chooses an egress port or ports 22B through which the packet is to be transmitted. The descriptor may also indicate the quality of service (QoS) to be applied to the packet, i.e., the level of priority for transmission, and any applicable instructions for modification of the packet header. For multicast packets, processor 56 typically generates multiple descriptors, one for each egress port 22B that is to transmit a copy of the packet. All of these descriptors may have the same QoS (indicated, for example, by a QoS index value), or they may be assigned to two or more different QoS levels for different egress ports.

Descriptor processor 56 places the descriptors in the appropriate transmit queues (shown as queues 46 in the preceding figures) in a queueing system 60, to await transmission via the designated egress ports 22B. Typically, queuing system 60 contains a dedicated transmit queue for each egress port 22B or multiple transmit queues per egress port, one for each QoS level. Upon queuing a descriptor in queuing system 60, processor 56 notifies buffer control logic 40 that the corresponding packet is consuming buffer space in memory 36, and logic 40 notes the buffer consumption against the appropriate allocation 42, 44, . . . , for the packet type in question. Alternatively, the buffer consumption update to buffer control logic 40 may come from queuing system 60.

When a descriptor reaches the head of its transmit queue, queuing system 60 passes the descriptor to a packet modifier 62 for execution. Packet modifiers 62 are respectively coupled to egress ports 22B and serve as packet transmission units. In response to the descriptor, packet modifier 62 reads a copy of the appropriate packet data from memory 36, and makes whatever changes are called for in the packet header for transmission to network 24 through egress port 22B. In the case of multicast packets, packet modifier 62 may replicate the packet data, while the original data remain in memory 36 until all of the packet copies have been transmitted.

Upon the transmission of the packet (or the last packet copy, in the case of multicast transmission) through the corresponding egress port 22B, packet modifier 62 signals buffer control logic 40, and may also signal decision control logic 52, as indicated in the figure. Alternatively, this packet transmission notification may come from queuing system 60. In response to this notification, buffer control logic 40 releases the buffer space in the corresponding allocation 42, 44, . . . , so that the location in memory 36 can be overwritten, and the allocation is free to accept further packets of the corresponding type. This memory accounting and management process typically takes place for multiple different packets in parallel at any given time.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
multiple interfaces configured to be connected to a packet data network so as to serve as both ingress and egress interfaces in receiving and forwarding of data packets of multiple different types, including at least first and second types, from and to the network by the apparatus;
a memory coupled to the interfaces and configured as a buffer to contain packets received through the ingress interfaces while awaiting transmission to the network via the egress interfaces; and
packet processing logic, which is configured to maintain multiple transmit queues, which are associated with respective ones of the egress interfaces, and to place both first and second queue entries, corresponding to first and second data packets of the first and second types, respectively, in a common transmit queue for transmission through a given egress interface, while allocating respective spaces in the buffer to store the first and second data packets against separate, first and second buffer allocations, which are respectively assigned to the first and second types of the data packets,
wherein the multiple transmit queues comprise at least two transmit queues that are both associated with the same, given egress interface and have different, respective levels of quality of service, and wherein the first and second data packets of the different, first and second types have a common level of quality of service.

2. The apparatus according to claim 1, wherein the first and second types of the data packets are transmitted using different, respective, first and second transport protocols.

3. The apparatus according to claim 1, wherein the packet processing logic is configured, when a given queue entry reaches a head of the common transmit queue, to transmit a corresponding data packet through the given egress interface and to release a corresponding space in a respective one of the first and second buffer allocations.

4. The apparatus according to claim 1, wherein the first buffer allocation is shared over multiple transmit queues associated with multiple, different egress interfaces through which the data packets of the first type are transmitted.

5. The apparatus according to claim 1, wherein the packet processing logic is configured to apply a congestion avoidance mechanism separately to the first and second types of the data packets responsively to respective fill levels of the first and second buffer allocations.

6. The apparatus according to claim 1, wherein the first type of the data packets consists of unicast packets, while the second type of the data packets consists of multicast packets.

7. A method for communication, comprising:

receiving through ingress interfaces of a network element data packets of multiple different types, including at least first and second types;

allocating respective spaces in a buffer in the network element to store the first and second data packets against separate, first and second buffer allocations, which are respectively assigned to the first and second types of the data packets, while the data packets await transmission to the network via egress interfaces of the network element;

maintaining in the network element multiple transmit queues, which are associated with respective ones of the egress interfaces, wherein maintaining the multiple transmit queues comprises associating at least two transmit queues, having different, respective levels of quality of service, with the same, given egress interface;

placing both first and second queue entries, corresponding to first and second data packets of the first and second types, respectively, in a common transmit queue for transmission through a given egress interface, wherein the first and second data packets of the different, first and second types have a common level of quality of service; and transmitting each the first and second data packets through the given egress interface when the corresponding queue entries reach a head of the common transmit queue.

8. The method according to claim 7, wherein the first and second types of the data packets are transmitted using different, respective, first and second transport protocols.

9. The method according to claim 7, wherein transmitting each of the first and second data packets comprises releasing a corresponding space in a respective one of the first and second buffer allocations upon transmitting a corresponding data packet through the given egress interface.

10. The method according to claim 7, wherein allocating the respective spaces comprises sharing the first buffer allocation over multiple transmit queues associated with multiple, different egress interfaces through which the data packets of the first type are transmitted.

11. The method according to claim 7, and comprising applying a congestion avoidance mechanism separately to the first and second types of the data packets responsively to respective fill levels of the first and second buffer allocations.

12. The method according to claim 7, wherein the first type of the data packets consists of unicast packets, while the second type of the data packets consists of multicast packets.

* * * * *